H. C. HOLLENBECK.
TUFT MAKING MACHINE.
APPLICATION FILED DEC. 5, 1911.

1,200,838. Patented Oct. 10, 1916.
6 SHEETS—SHEET 1.

WITNESSES:
W. Ray Taylor
Leroy S. Hodges

INVENTOR
Hubert C. Hollenbeck
BY Cuper & Popp
ATTORNEYS

H. C. HOLLENBECK.
TUFT MAKING MACHINE.
APPLICATION FILED DEC. 5, 1911.

1,200,838.

Patented Oct. 10, 1916.
6 SHEETS—SHEET 4.

WITNESSES:
W. Ray Taylor.
Leroy S. Hodges

INVENTOR
Hubert C. Hollenbeck
by Leeper & Popp
ATTORNEYS

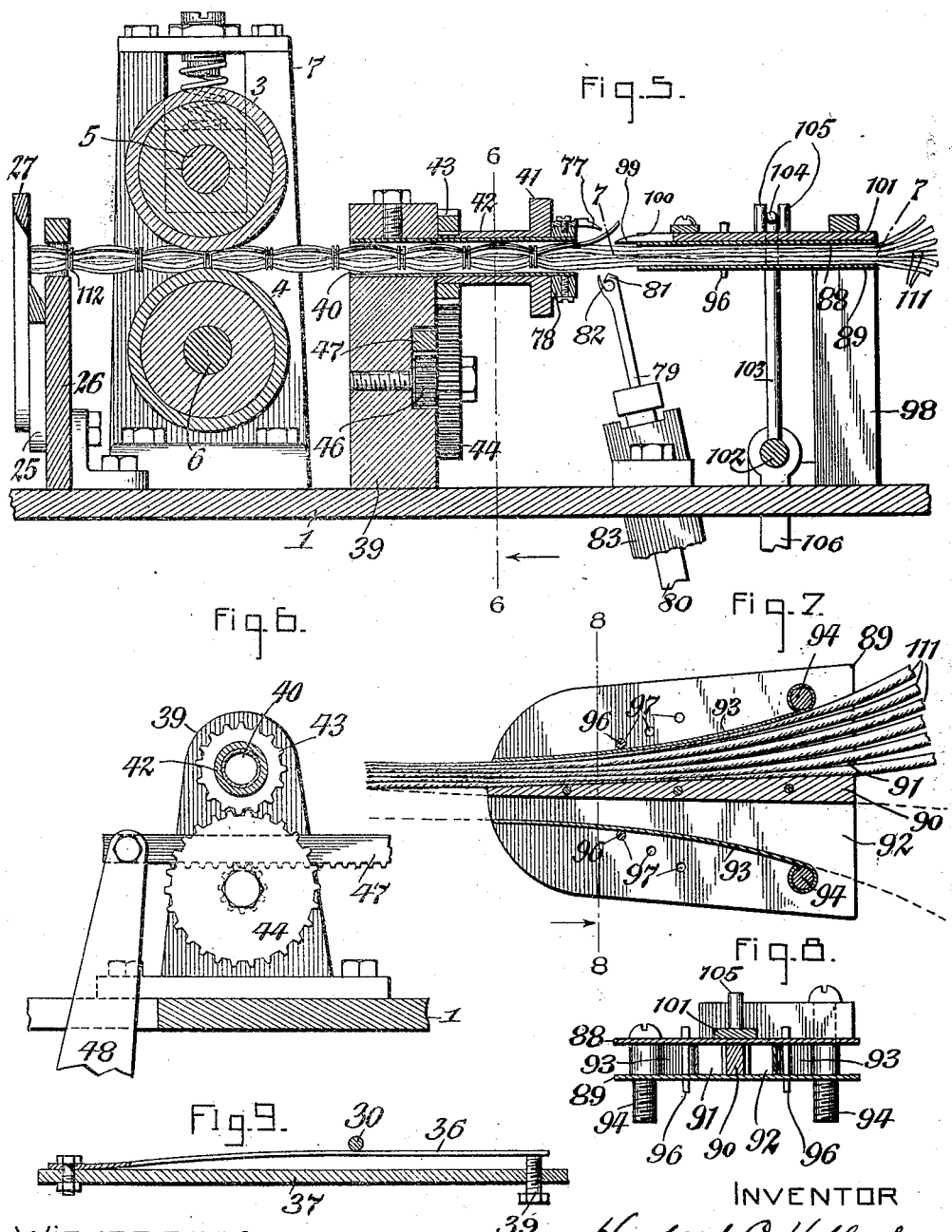

H. C. HOLLENBECK.
TUFT MAKING MACHINE.
APPLICATION FILED DEC. 5, 1911.
1,200,838.
Patented Oct. 10, 1916.
6 SHEETS—SHEET 6.
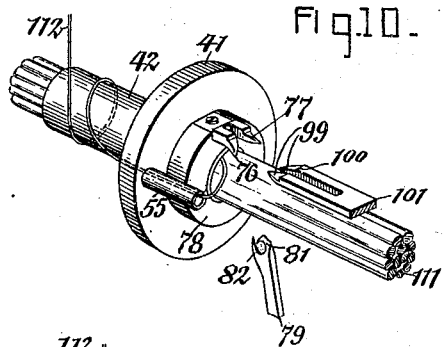
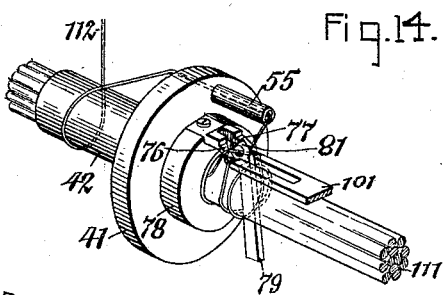
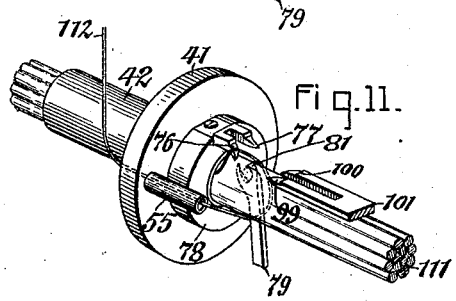
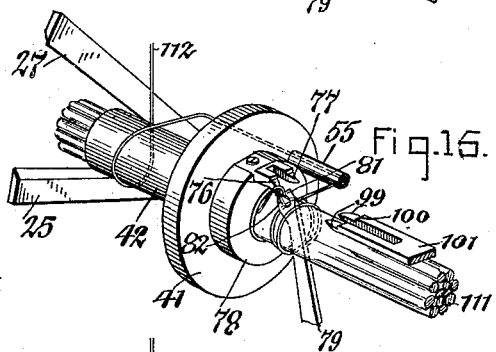
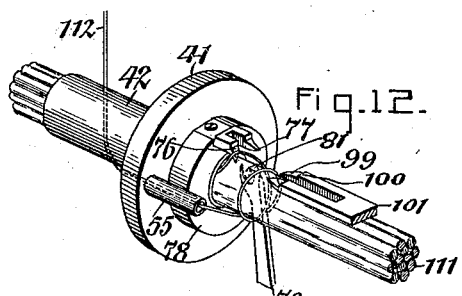
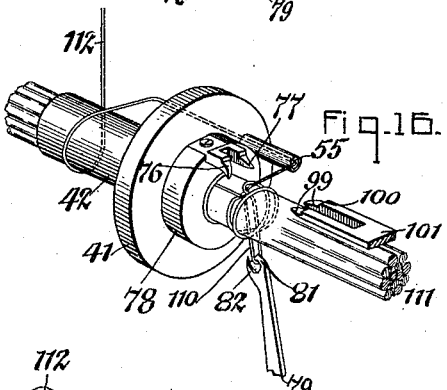
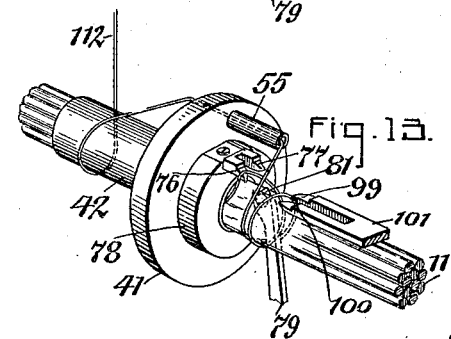
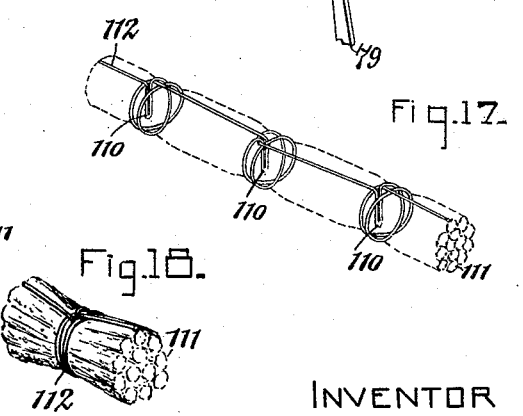
WITNESSES:
W. Ray Taylor
Leroy S. Hodges
INVENTOR
Hubert C. Hollenbeck
by Leeper & Popp
ATTORNEYS

UNITED STATES PATENT OFFICE.

HUBERT C. HOLLENBECK, OF LOCKPORT, NEW YORK.

TUFT-MAKING MACHINE.

1,200,838. Specification of Letters Patent. Patented Oct. 10, 1916.

Application filed December 5, 1911. Serial No. 663,999.

*To all whom it may concern:*

Be it known that I, HUBERT C. HOLLENBECK, a citizen of the United States, residing at Lockport, in the county of Niagara and State of New York, have invented new and useful Improvements in Tuft-Making Machines, of which the following is a specification.

This invention relates to a machine for making tufts from strands of yarn for use in manufacturing mattresses, quilts, &c.

It is the object of this invention to produce a reliable and comparatively simple machine whereby tufts of this character may be manufactured expeditiously and economically and which produces tufts in which the several strands of each tuft are held together sufficiently tight that they are not liable to become separated while transporting and handling them preparatory to sewing them on a mattress or other place where they are to be used.

Figure 1:
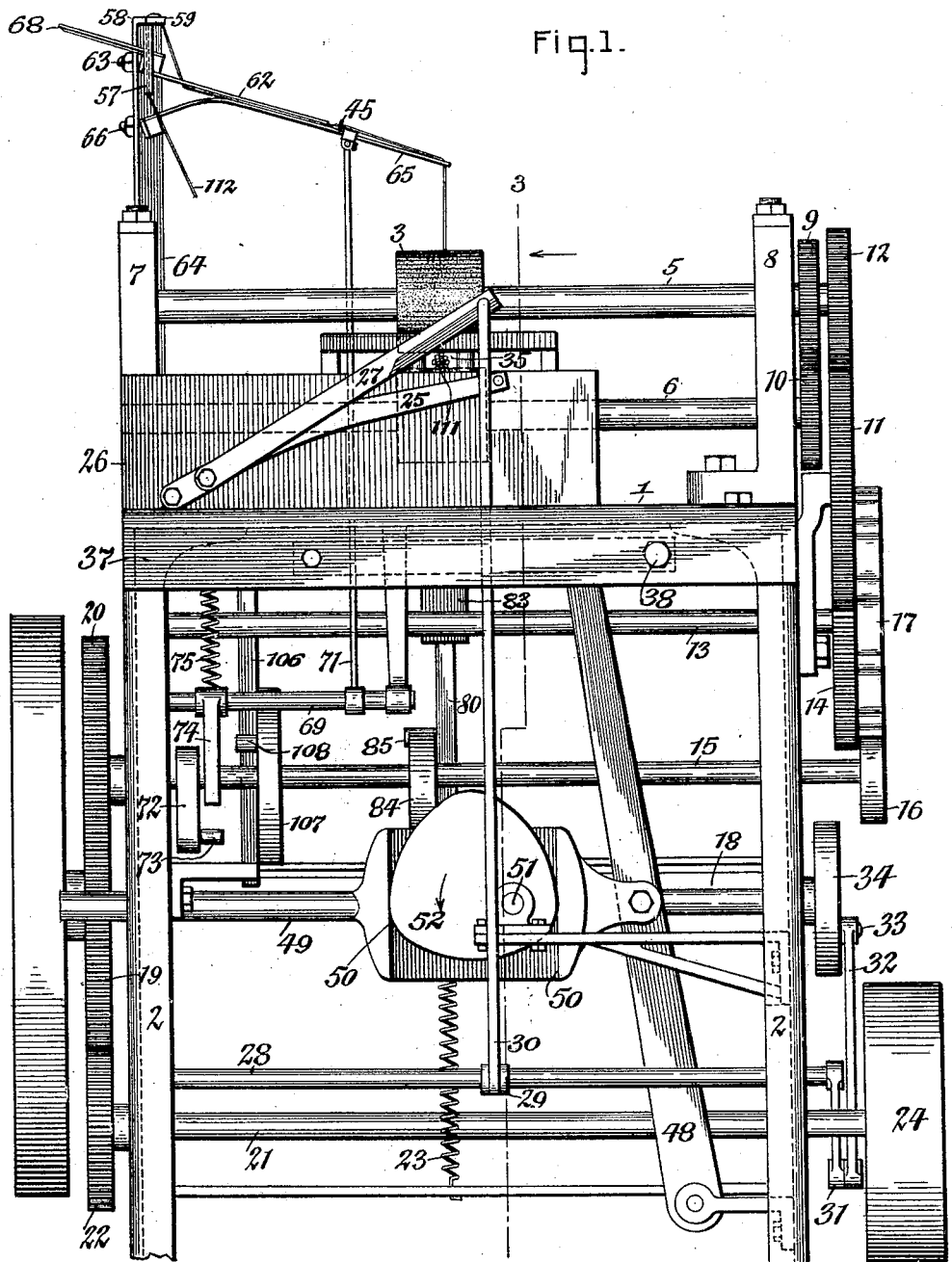
Figure 2:
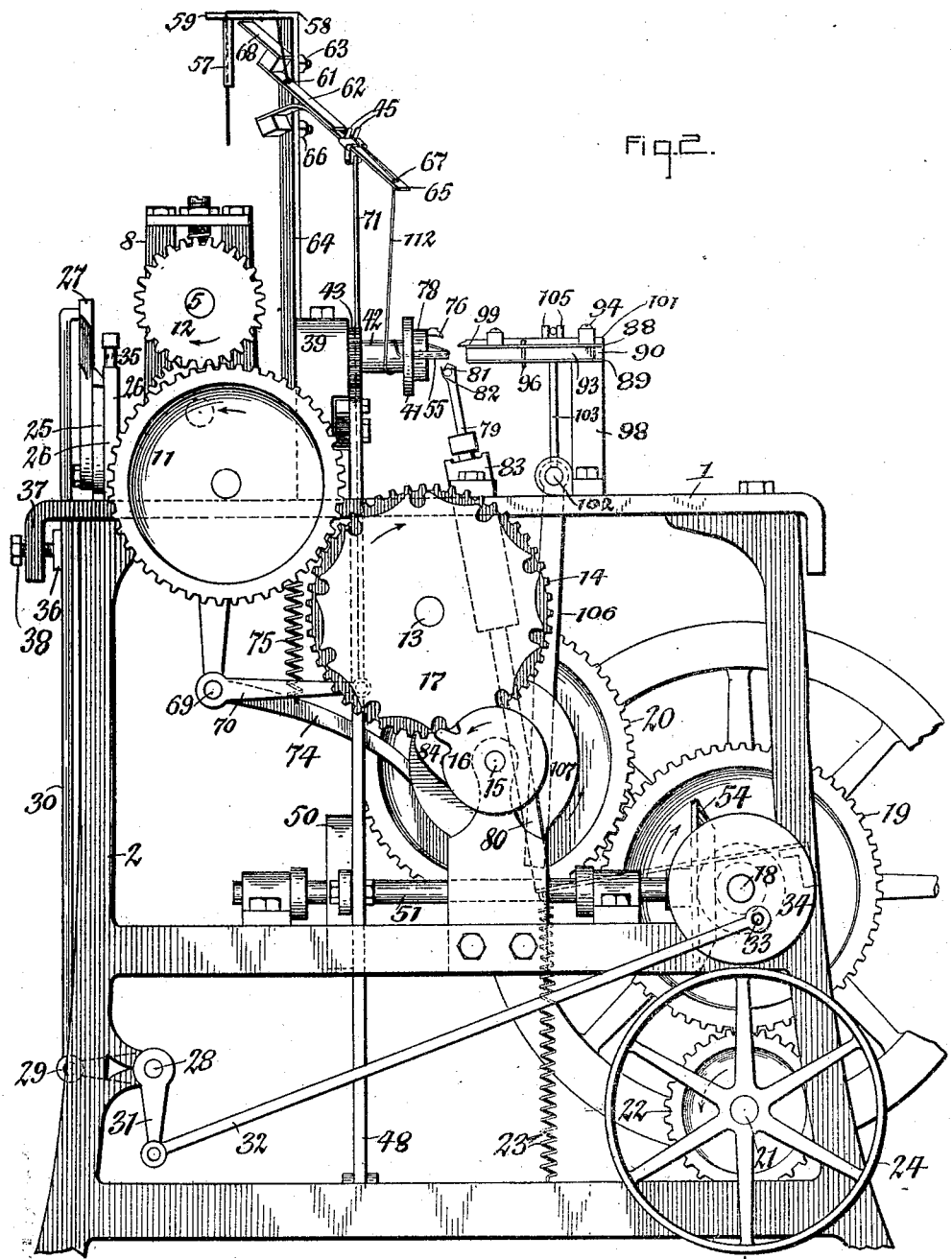
Figure 3:
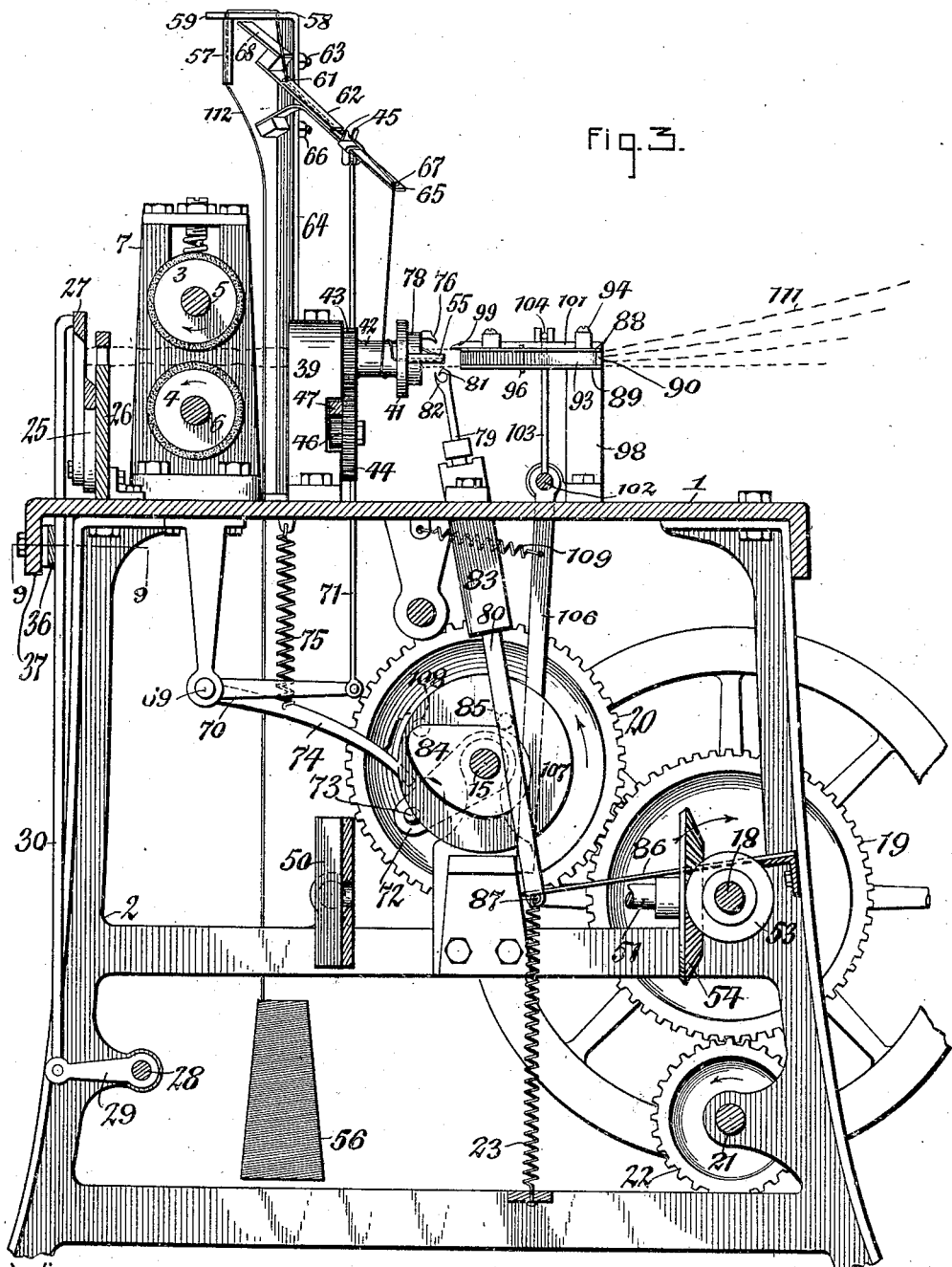
Figure 4:
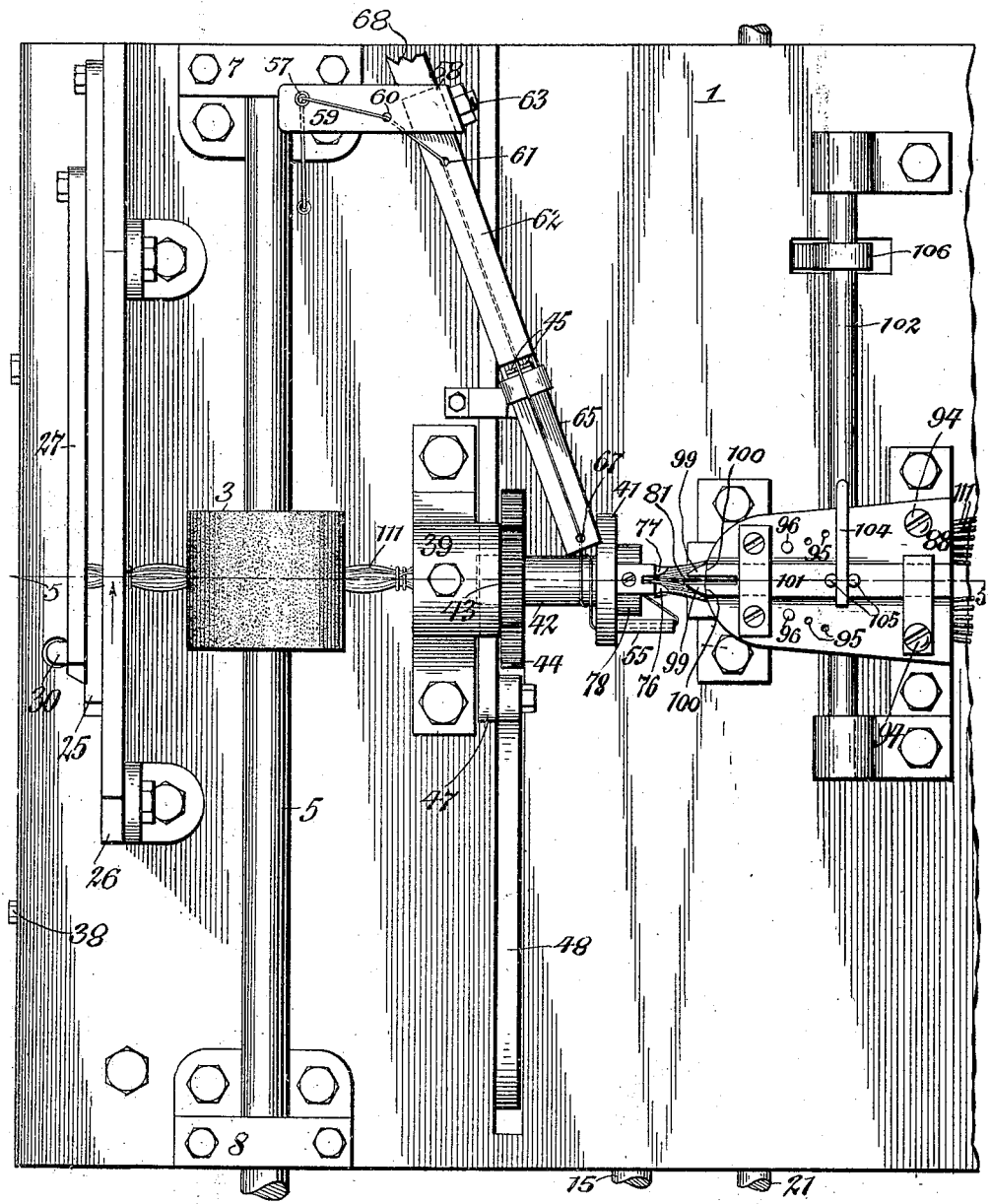

In the accompanying drawings consisting of 6 sheets: Figure 1 is a front elevation of a tuft making machine embodying my invention. Fig. 2 is an end elevation thereof viewed from the right. Fig. 3 is a vertical longitudinal section taken in line 3—3, Fig. 1. Fig. 4 is a top plan view of the machine. Fig. 5 is a fragmentary vertical longitudinal section, on an enlarged scale, taken in line 5—5, Fig. 4. Fig. 6 is a vertical transverse section taken in line 6—6, Fig. 5. Fig. 7 is a fragmentary horizontal section, on a still larger scale, taken in line 7—7, Fig. 5. Fig. 8 is a vertical transverse section taken in line 8—8, Fig. 7. Fig. 9 is a fragmentary horizontal section taken in line 9—9, Fig. 3. Figs. 10-16 are fragmentary perspective views showing different positions of the tuft binding mechanism. Fig. 17 is a similar view showing the manner in which a succession of windings of the binding thread are applied to the yarn rope. Fig. 18 is a perspective view of one of the completed tufts produced by this machine.

Similar characters of reference indicate corresponding parts throughout the several views.

The main frame of this machine which supports the working parts may be of any suitable construction, that shown in the drawings comprising a horizontal table or top plate 1, and uprights or standards 2, 2 supporting opposite ends of the table.

In its general organization the working parts of this machine comprise the following main elements viz: a feeder whereby the strands of yarn 111 from which the tufts are made are drawn through the machine while gathered in the form of a rope, a winder which operates to wind a binding thread or cord 112 at intervals around the rope of yarn, a needle whereby the binding thread 112 is tucked into the body of the rope for preventing the thread from becoming loose, a guide whereby the several strands of yarn are directed to the winder and gathered in the form of a rope, and a cutter which operates to cut the yarn of rope at intervals between the windings of threads on the same.

The feeding device preferably comprises two rollers 3, 4 which are arranged one above the other and mounted on horizontal shafts 5, 6 which are journaled in suitable bearings arranged on standards 7, 8 rising from the front part of the table. These feed rollers are operated so that their opposing sides move forwardly and cause the rope of yarn which is engaged on its opposite sides by these rollers to move forwardly. Means are provided for causing these rollers to turn in unison and intermittently so that the rope of yarn is advanced step by step with an interval of rest between successive steps. The preferred means for thus operating the feed rollers which are shown in the drawings comprise a pair of coöperating gear wheels 9, 10 which are secured respectively to the shafts of the feed rollers, an intermediate gear wheel 11 pivoted on the main frame and meshing with a driven pinion 12 on the shaft 5 of the upper feed wheel, an intermediate shaft 13 journaled in suitable bearings on the main frame and provided with a driving gear wheel 14, meshing with the intermediate gear wheel 11, and an operating shaft 15 journaled in suitable bearings on the main frame and provided with a Geneva or intermittent stop pinion 16 which meshes with a Geneva or intermittent stop wheel 17 on the intermediate shaft 13. The operating shaft makes one rotation for each operation of the machine and the relative timing of the pinions and wheels which transmit the movement from the operating shaft to the feed wheels is such that the latter are caused to feed the yarn rope forward at each step a distance equal to the length of a tuft and then remain at rest before beginning the next step a sufficient length of time to permit a binding thread to be applied to the rope of yarn by the mechanism provided for this purpose and the cutting mechanism to sever a completed tuft from the front or advancing end of the yarn rope.

Any suitable means may be provided for continuously turning the operating shaft at the proper speeds those shown in Figs. 1, 2 and 3 of the drawings comprising a horizontal transverse counter shaft 18 journaled in suitable bearings on the rear part of the main frame and operatively connected with the operating shaft by means of a pair of intermeshing gear wheels 19, 20 secured to corresponding ends of the counter and operating shafts, and a driving shaft 21 journaled transversely and horizontally in suitable bearings on the lower rear part of the main frame and provided with a pinion 22 meshing with a driven gear wheel 19 on the counter shaft and with a driving pulley 24 adapted to receive a driving belt whereby power from any suitable source may be transmitted to the driving shaft.

Various means may be employed for severing the rope of yarn at intervals between the places where the binding thread is applied to the same. The preferred means for this purpose shown in Figs. 1, 2, 3, 4 and 5 of the drawings comprise a lower stationary cutting blade 25 mounted on an upright bracket 26 rising from the front part of the table in front of the feed rollers, an upper movable cutting blade 27 coöperating with the lower blade and pivoted at one end for vertical oscillation to said bracket, a cutter rock shaft 28 journaled transversely and horizontally in suitable bearings on the lower front part of the frame, an upper rock arm 29 projecting forwardly from the cutter shaft and connected by an upright rod 30 with the free end of the movable blade, a lower rock arm 31 depending from the cutter shaft, and a connecting rod 32 connected at its front end with the lower rock arm 31 while its rear end is connected with a crank pin 33 on a disk 34 secured to the corresponding end of the counter shaft 18. The counter shaft also makes one turn for each operation of the machine and the movement of the parts whereby motion is transmitted from this shaft to the movable cutter blade is so timed that the two cutter blades are separated while the feed wheels are in motion and permit the latter to move the front end of the yarn rope between the cutter blades and after the forward movement of each step of the feed wheels has been completed and the yarn rope is at rest the movable blade descends and coöperates with the lower blade so that the yarn rope is severed midway between the foremost winding of the thread and the next following winding of the same whereby a completed tuft at the front end of the rope of yarn is severed therefrom.

The bracket 26 is preferably provided with a guideway 35 which is in line or substantially so with the space between the feed rollers and the space between the cutting blades in the separated position of the latter which guideway receives the yarn rope and directs the same from the feed rollers to the cutter blades.

For the purpose of causing the movable cutter blade to always bear firmly sidewise against the stationary blade and also to take up any wear between the same so as to insure perfect severing of the tufts from the yarn rope, a tension device is provided which preferably consists of a leaf spring 36 bearing against the front side of the connecting rod 30 below the table and connected at one end to a depending flange 37 on this part of the table while its opposite end is engaged by an adjusting screw 38 which is mounted on said flange. Upon turning this screw in the proper direction the tension upon the spring 36 may be adjusted for causing the movable cutter blade to bear laterally with the desired pressure against the side of the stationary blade.

The mechanism whereby the thread is wound at intervals around the rope of yarn is arranged in rear of the feed rollers and is constructed as follows: 39 represents the stationary bracket mounted on the table in rear of the feed rollers and provided at its upper end with an opening in which is secured a stationary tube 40 which is arranged lengthwise and horizontally in line with the space between the feed rollers and which receives the rope of yarn on its interior and guides the same to the feed rollers and which also forms a bearing and support on the exterior of its rear end for other parts of the binding mechanism which will be presently described.

41 represents a rotatable winding disk or head mounted on the rear end of a tubular hub 42 which is journaled on the tubular guide bearing 40 in rear of the bracket 39. An intermittent rotary movement in opposite directions is imparted to this winding disk by means which preferably comprise a driven pinion 43 secured to the front end of the hollow or tubular shaft in rear of the bracket 39, a gear wheel 44 pivoted on the lower rear part of the bracket 39 and meshing with the pinion 43, a driving pinion 46 turning with the gear wheel 44, a horizontally and transversely reciprocating gear rack 47 guided in suitable ways on the bracket 39 and the table and meshing with the upper side of the driving pinion 46, an upright rock lever 48 pivotally connected at its upper end with the gear rack and fulcrumed at its lower end on the lower part of the main frame so as to swing transversely in the machine, a shipper rod 49 guided at one end on the main frame and pivotally connected at its opposite end with a rock lever 48 and provided with two upright bearing faces 50, 50, a horizontal longitudinal shaft 51 journaled in suitable bearings on the main frame and provided at its front end with a cam 52 engaging with the bearing faces 50 of the shipper rod and a bevel pinion 53 mounted on the counter shaft and meshing with a bevel gear wheel 54 at the rear end of the winder shaft 51. The timing of this mechanism whereby motion is transmitted from the counter shaft to the winding disk is so constructed that during one operation of the machine the winding disk is turned approximately two and a half rotations in one direction for winding the thread around the adjacent part of the yarn rope, then remains at rest while the thread tucking, yarn feeding and cutting operations are performed, and then again rotates approximately two and a half rotations in the opposite direction during the next operation of the machine for effecting the winding of the thread around the next following part of the yarn rope, and so on, each stroke of the gear rack in one direction corresponding to a complete operation of the machine.

The binding thread which is adapted to be wound at intervals around the rope of yarn for the purpose of holding the several strands of the completed tuft together when the same is severed from the rope, may be supplied in various ways to an eye 55 of tubular form projecting rearwardly from the winding disk on one side of its axis. As shown in the drawings, the thread is supplied from a spool or bobbin 56 arranged within the lower part of the frame and supported in any suitable manner and from this spool the thread passes upwardly through a stationary guide sleeve 57 carried by a tension bracket 58 on the upper side of the table, thence horizontally over an arm 59 of this bracket and downwardly through an opening 60 thereof, thence downwardly through an opening 61 formed in a flat upper tension spring 62 which is adjustably secured at one end by means of a bolt 63 to an upright 64 of said bracket, thence lengthwise along the underside of said upper tension spring toward the free end thereof and also lengthwise over the upper side of a lower flat tension spring 65 which is adjustably secured at its fixed end by means of a bolt 66 to the upright of said bracket, thence downwardly through an opening 67 at the free end of the lower tension spring, thence around the hub of the winding disk and thence rearwardly through the eye of the winder, and thence to the rope of yarn about which the thread is to be wound. The thread is drawn from the spool or bobbin, as required, by the rotative movement of the winder and while the thread is thus withdrawn from the spool a tension is placed upon the same so as to keep it taut between the eye of the winder and the yarn rope, this tension being due to the frictional resistance which the thread encounters as it turns the corners and changes the direction of its movement in passing through the eyes or openings of the bracket 39 and the openings of the tension springs, and the grip of these tension springs against opposite sides of the thread. By turning the bolts 63, 66 more or less on the upright of the tension bracket the frictional grip of the tension springs may be varied as required, the nuts of these bolts being tightened for holding the tension springs in position after adjustment. For the purpose of permitting a delicate adjustment of the grip of the tension springs on the thread the supporting bolt 63 of the upper spring is provided with a tail 68 which projects in a direction opposite to the upper tension spring. This tail may be wrapped lightly for slightly shifting the upper tension spring until the desired pressure upon the thread is obtained.

While the winding device is at rest and the rope of yarn is advanced by means of the feed rollers the tension upon the thread is reduced so as to prevent undoing of the thread which has just been applied to the yarn rope. For this purpose the lower tension spring is depressed out of engagement from the upper tension spring during the time that the yarn rope is moved forward and permitted to again rise into engagement with the upper tension spring, this being preferably effected by means of a horizontal tension rock shaft 69 journaled transversely in bearings on the upper front part of the frame and provided with a rearwardly projecting rock arm 70 which is connected by an upright rod 71 with the lower tension spring, a rotatable tappet arm 72 mounted on the operating shaft and provided with a tappet pin or cam 73 which engages with another rock arm 74 on the tension rock shaft for turning the same in a direction in which the lower tension spring is depressed, and a spring 75 connecting the rock arm 74 with the underside of the table and operating to turn the rock shaft 69 in the direction for raising the lower tension spring when the tappet 73 clears the rock arm 74. In order to confine the thread lengthwise between the free ends of the upper and lower tension springs a fork 45 is mounted on the upper side of the lower tension spring the prongs of which receive the adjacent part of the binding thread between them.

In rear of the winding disk and preferably on the upper side of the path of the yarn rope and within the circular path of the eye of the winder are arranged two rearwardly projecting retaining horns 76, 77 upon one or the other of which the binding thread is supported during part of the operation of applying the thread to the yarn rope. These horns are stationary and are preferably supported side by side on a collar 78 which is mounted on the rear end of the stationary tubular guide and bearing 40, as shown in Figs. 2, 3, 4 and 5.

The tucking needle whereby a part of the binding thread or cord is tucked or drawn into the body or between the strands of the rope for the purpose of preventing the tuft from subsequently becoming loose or unraveled comprises an upright shank 79 secured to the upper end of a needle bar or slide 80 and provided at its upper end with a bill or hook 81 which projects from the rear edge or side of the needle shank forwardly and downwardly and a guard or beard 82 projecting from the front edge or side of the needle shank upwardly in front of the point of the bill or hook and separated from the latter so as to form an upwardly opening mouth between said bill and beard. The shank of the needle and the needle bar incline rearwardly from the upper end toward the lower end thereof and a reciprocating movement is imparted to these parts so that hook and beard pass at intervals upwardly and downwardly through the central part of the rope of yarn at an angle to the path of the latter, such an upward and downward movement of the needle taking place for each binding operation of the machine. The needle bar for this purpose is preferably guided in an inclined way 83 arranged on the central part of the table and its upper movement is effected by means of a rotary cam 84 secured to the operating shaft and engaging with a pin 85 on the needle bar below said guideway and its downward movement is effected by a coil spring 23 connecting the lower end of the needle bar with the lower part of the main frame. The cam 84 is so constructed that the upper end of the needle is arranged below the path of the yarn rope while the same is being fed forward but during the first part of the operation of winding the binding thread about the yarn rope the upper end of the needle is raised sufficiently to cause the same to enter the yarn rope from the underside and project with the upwardly tapering upper side of its bill slightly above the top of the yarn rope and during the intermediate part of this binding operation the needle completes its upward stroke and projects its hook and beard above the yarn rope and during the last part of the operation the needle drops quickly so as to withdraw its upper end from the yarn rope and stand below the path of the latter preparatory to effecting the next forward step of this rope. In order to prevent an upward rebound of the binding needle and hold the same firmly in engagement with its lifting cam a retaining spring 86 is provided which is preferably of leaf form and secured at one end to the frame while its opposite end engages with a pin 87 on the lower end of a needle bar, as shown in Figs. 1 and 3. This retaining spring supplements the action of the coil spring 23 and the effect of gravity for returning the needle bar to its lowered or inoperative position.

The tufting strands which together form the rope from which the individual tufts are formed are supplied from spools, bobbins or any other suitable source and conducted to the guide tube 40 within the winder in two groups. These two groups of tufting strands pass through a preliminary guide which is arranged immediately in rear of the winding device which preferably comprises upper and lower plates 88, 89 and a longitudinal upright partition or wall 90 arranged between these plates and forming with the latter two horizontal guideways 91, 92 which are arranged parallel and receive the two groups of tufting strands. As the tufting strand passes through these guideways the two groups are pressed against opposite sides of the partition between the two groups by means of leaf springs 93 each of which is arranged in one of the guideways and is mounted at its rear end by means of an upright screw or fastening 94 to the adjacent parts of the upper and lower guide plates while its free front end is held yieldingly in contact with the adjacent group of tufting strands by means of a vertical retaining pin 96 engaging with the outer side of the pressure spring and engaging with one of a plurality of pairs of coinciding openings 95, 97 formed in the upper and lower guide plates 88, 89. The several pairs of openings 95, 97 are arranged different distances from the partition 90 so that by placing the retaining pin 96 in one or the other of these pairs of openings the tension on the pressure spring may be varied to suit the number of strands of yarn which are employed in each group. The upper and lower plate and the longitudinal partition forming these two guideways are stationary and may be supported by means of a bracket 98 rising from the rear part of the table or in any other suitable way.

For the purpose of enabling the hook of the tucking needle to reliably engage with the binding thread or cord above the yarn rope preparatory to drawing a part of this thread in the form of a loop into the body of the rope, a thread deflector is provided which operates to push the two crossing parts of the binding thread above the rope forwardly out of the path of the needle hook. This deflector is preferably constructed in the form of a fork the prongs 99, 99 of which are arranged above the path of the rope in rear of the winder and below the retaining horns and each prong is provided on its upper side and in rear of its point or front end with a forwardly facing shoulder 100. This deflector fork is formed on the front end of a slide 101 which is guided in ways on the upper side of the top guide plate 98 so that it is capable of reciprocating horizontally and lengthwise of the yarn rope. This reciprocating movement may be produced by various means but preferably by the means which are shown in the drawings and which comprise a horizontal rock shaft 102 journaled transversely in bearings on the upper side of the table, an upper rock arm 103 projecting upwardly from the deflector rock shaft and provided at its upper end with a laterally projecting finger 104 which is arranged between two upwardly projecting pins 105 on the central part of the deflector slide, a lower rock arm 106 depending from the deflector rock shaft through an opening in the table, a cam disk 107 mounted on the operating shaft and provided with a cam pin 108 adapted to engage with the lower deflector arm 106 for moving the deflector forwardly, and a spring 109 which connects the lower arm 106 with the underside of the table and operates to shift the parts for moving the deflector fork rearwardly. The means for operating the deflector are so timed that the forward movement of the same is effected during the last part of the operation of winding the binding thread around the yarn rope preparatory to engaging the thread by means of the tucking needle and to retract the deflector into its rearmost position immediately after the hook of the tucking needle engages with the binding thread.

In Figs. 1, 2, 3, 4, 5 and 10, the parts are shown in the position which they occupy after an operation of winding the binding thread around the yarn rope has been completed, the rope has been fed forward a step, and a finished tuft has been cut off from the front end of this rope. During the forward movement of the strands of yarn they pass in two substantially equal groups forwardly along opposite sides of the longitudinal partition of the preliminary guide and come together in front of this partition so as to form one rope-like body before passing forwardly through the stationary guide tube 40 to the feed rollers and cutter mechanism. Immediately in front of the partition the two groups of cutting strands are separated slightly and form a gap between the same through which the tucking needle subsequently rises preparatory to forming the tucking loop in the thread as will be presently described. In the operation of the machine the binding thread is applied to one part of the rope and then wound around the next following part of the rope, this operation being repeated continuously and a plurality of such binding threads being applied to successive parts of the rope so that this thread extends continuously from one winding to the next, as shown in Fig. 17, and a plurality of tufts are bound together while the same still form a part of the rope and before the latter reaches the cutting mechanism.

When the machine is first started the front end of the thread may be tied or otherwise secured to the rope of yarn but after the machine is in operation the thread is held on the rope at each binding ready to be applied to the next following portion thereof.

In producing a binding of thread or cord around the rope of tufting yarn the thread winder makes approximately two and a half rotations in one direction. Assuming that the machine starts from the position of the parts shown in Figs. 1, 2, 3, 4, 5 and 10 the winder during its first complete rotation lays the thread by means of its eye over the retaining horn 76 which is nearest to the point at which the eye of the winder is located when beginning this rotation and while making this turn the eye winds the thread once around the rope of yarn, as shown in Fig. 11. At the same time the tucking needle is raised so that the same passes upwardly to the central part of the rope and comes to rest with the tapering upper part of its hook or bill projecting slightly above the top of the rope and in such position that the upper part of the first turn of the thread is arranged in front of the hook and the lower part of this first turn of the thread is also arranged in front of the needle as shown in Fig. 11.

As the thread is wound over the retaining horn 76 and around the yarn rope by the winding eye during the first rotation of the latter that part of the binding thread extending from the horn 76 to the periphery of the rope is arranged tangentially relatively to the latter, as shown in Fig. 11. The winding of the upper part of the first turn of the thread over the retaining horn and in front of the needle in the rope is due to the front end of the thread being carried with the rope into the guide tube 40 so that the front end of this section or part of the thread inclines from the rope to the eye of the winder as shown in Fig. 2 and is thus intercepted by the retaining horn 76 and is also caused to wind around the yarn rope in front of the hook of the needle due to this inclination of the front part of the thread from the guide tube 40 to the rear end of the eye of the winder.

As the winder makes its second complete rotation about the yarn rope the thread is wound over the top of the rope in rear of the hook of the needle by reason of the fact that the beginning of the winding of this thread begins on the underside of the rope at a point substantially in alinement transversely with the rear end of the winding eye aided by the beveled rear side of the needle hook which tends to deflect the thread engaging with the same toward the upper side of the rope in rear of this hook, but the lower part of the second turn of this thread is again applied to the underside of the rope in front of the needle owing to the inclination of the shank of the needle relatively to the plane of rotation of the rear end of the winding eye. This second winding of the binding thread around the rope is indicated in Fig. 12.

As the winder effects the next quarter of a rotation the eye thereof carries the thread partly over the upper side of the rope and tangentially across and in rear of that part of the thread which extends from the horn 76 to the periphery of the yarn rope but at an opposite angle thereto, as shown in Fig. 13. When the winder reaches this position and has wound the thread about the yarn so that the tangential end portions thereof cross each other above the yarn rope the deflector moves forwardly and engages the shoulders of its prongs with the two tangential parts of the thread below the point of intersection between the same and pushes the same forwardly to a point in front of the hook of the needle and immediately thereafter the needle completes the second half of its upward movement and causes its hook to engage over the front tangential part of the thread above its point of crossing with the rear tangential part thereof, as shown in Fig. 14.

The instant the hook of the needle is thus engaged with the front tangential part of the binding thread the deflector is retracted into its rearward position, as shown in Fig. 15, and the needle moves downwardly through the yarn rope into its lowermost position in which it stands below the path of the rope, whereby that part of the thread extending upwardly from the guide tube 40 to the retaining horn 76 and from the latter tangentially to the periphery of the yarn rope is pulled by the hook of the needle from the horn and drawn in the form of a loop 110 downwardly through the central part of the yarn rope and between the rear tangential part of the thread and the upper part of the second winding, as shown in Fig. 16. After the hook of the needle has engaged with the front part of the thread above the rope of yarn and while the hook of the needle pulls this part of thread downwardly through the yarn rope the eye of the winder completes the last quarter of its rotation in one direction, as shown in Figs. 15 and 16.

At the same time that the needle is effecting its downward stroke and carrying the loop of binding thread downwardly through the rope the latter is moved forwardly one step by the feeding rolls whereby the angle of the loop of thread engaged by the needle is increased and this loop is caused to slip off from the hook of the latter as the loop moves forwardly with the rope. During such forward movement of the rope the lower turn of the loop 110 is also withdrawn into the body or between the strands of the yarn rope and concealed thereby owing to the frictional resistance encountered by the unused part of the thread in passing through the various parts which support the same, such as the guides 57, 59, 61 and 67. As the needle draws the loop of thread downwardly through the yarn rope no additional thread is withdrawn from the supply bobbin or spool 56 for this purpose inasmuch as that portion of the thread extending from the guide tube 40 to the horn 76 and from the latter to the periphery of the yarn rope supplies the necessary slack or surplus thread for forming the tucking loop when this part of the thread slips off from the horn 76. During the forward movement of the rope the resistance which the needle offers to the tucking loop previous to the detachment of the latter from the tucking loop causes the binding thread to be tightened about the rope of yarn strands so that the latter are securely united by frictional engagement of the windings of thread about the strands and the loop thereof which is tucked in between the strands of the rope.

As the rope of yarn is moved forwardly its front end is passed between the blades of the cutter and at the end of this forward movement the cutter severs the foremost section of the bound rope and completes a tuft which drops away by gravity and at the same time the binding devices effect another cycle of operations for tying another binding thread around the yarn rope. When the winder completes its rotation in one direction it stands in a position relatively to the yarn rope diametrically opposite to where it commenced its rotation preparatory to completing the winding operation for the next tuft. During the next following reverse rotation of the winder the latter winds the binding thread in a reverse direction around the yarn rope and also around the other previously inactive retaining horn 77 while the previously active horn 76 is idle. In other respects the operations for producing the next binding around the yarn is the same as that previously described. During every two and a half rotations of the winder in one direction part of the thread is wound on the hub of the winder and during the next following rotation of the winder in the opposite direction the thread so wound upon its hub is unwound therefrom and again partly wound thereon in the reverse direction, thereby taking care of the thread in front of the winder during the rotary movement of the same and preventing snarling thereof without employing any special means for this purpose.

I claim as my invention:

1. A tuft making machine comprising means for supporting a bundle of parallel strands, rotating winding means for placing a tie circumferentially with a plurality of turns around said bundle of strands, and means movable transversely of said winding means for forming a loop near one end of the tie and tucking the same transversely between said strands and between two circumferential turns of the tie.

2. A tuft making machine comprising a rotatable winder having an eye which is adapted to receive a tying thread and wind the same circumferentially with a plurality of turns around the strands of the tuft, and a transversely movable needle adapted to engage said thread intermittently and move crosswise between said strands and draw a loop of said thread between the same and between two circumferential turns of the tie.

3. A tuft making machine comprising means for winding a binding thread around a bunch of strands, and a needle for tucking the thread between said strands having a hook for engaging said thread and a guard in front of said hook.

4. A tuft making machine comprising a rotatable winder adapted to wind a binding thread around a bunch of strands, means for securing the binding thread, and means for rotating said winder alternately in opposite directions comprising a driven pinion turning with said winder, an intermediate gear wheel meshing with said driven pinion, a driving pinion turning with said gear wheel, a gear rack meshing with said driving pinion, a rock lever connected with said gear rack and a rotatable cam engaging with said lever.

5. A tuft making machine comprising a rotatable winder adapted to wind a binding thread around a bunch of strands, a reciprocating needle adapted to draw said thread between said strands, and means for operating said needle comprising a sliding bar carrying said needle and provided with a pin or shoulder, a rotatable cam engaging with said pin or shoulder for moving said needle in one direction, and a spring for moving said bar in the opposite direction.

6. A tuft making machine comprising a winding device adapted to wind a binding thread around a bunch of strands, means for securing the binding thread, and means for intermittently moving said strands forwardly comprising a pair of feed wheels engaging with opposite sides of said strands, a driven stop wheel operatively connected by intermediate gearing with said feed rollers, and a driving stop pinion meshing with said stop wheel.

7. A tuft making machine comprising a rotatable winder adapted to wind a binding thread around a bunch of strands, a retaining horn which is arranged adjacent to said strands and over which a part of said thread is adapted to be passed by said winder, and a needle for detaching the thread from said horn and tucking the same between said strands.

8. A tuft making machine comprising a winder which is adapted to rotate alternately in opposite directions and wind a binding thread successively in opposite directions around different parts of a bunch of strands, a pair of horns which are arranged adjacent to the winder and around which parts of said thread are adapted to be wound alternately, and a needle adapted to engage that part of the thread on either of said horns and tuck the same between said strands.

9. A tuft making machine comprising a winding device for winding a binding thread around a bunch of strands, means for guiding said strands to said winding device having two guideways through which the strands move in two groups to the winding device, and a needle adapted to move between said groups of strands and tuck said binding thread therebetween.

10. A tuft making machine comprising a winding device for winding a binding thread around a bunch of strands, means for guiding said strands to said winding device having two guideways through which the strands move in two groups to the winding device, means arranged in said guideways for exerting pressure on said strands, and a needle adapted to move between said groups of strands and tuck said binding thread therebetween.

11. A tuft making machine comprising a winding device for winding a binding thread around a bunch of strands, means for securing the binding thread, means for guiding said strands in the form of two groups to said winding device comprising upper and lower guide plates and a partition arranged lengthwise between said plates, and springs for pressing said strands against opposite sides of said partition, each spring being mounted on said plates on one side of the partition and adapted to bear against one of the groups of strands.

12. A tuft making machine comprising a winding device for winding a binding thread around a bunch of strands, means for securing the binding thread, means for guiding said strands in the form of two groups to said winding device comprising upper and lower guide plates and a partition arranged lengthwise between said plates, springs for pressing said strands against opposite sides of said partition, each spring being mounted on said plates on one side of the partition and adapted to bear against one of the groups of strands and means for adjusting the tension of said springs consisting of retaining pins each engaging with the outer side of one of said springs and engaging with one pair of a plurality of pairs of openings arranged in the guide plates different distances from said partition.

13. A tuft making machine comprising a winding device for winding a binding thread around a bunch of strands, a horn arranged to be engaged by a part of said thread, a deflector adapted to deflect the thread between said horn and said strands, and a needle adapted to engage said thread and draw the same between the strands.

14. A tuft making machine comprising a winding device for winding a binding thread around a bunch of strands, a pair of horns arranged to be engaged alternately by a part of said thread, a deflector adapted to deflect the thread between said horns and the strands, and a needle adapted to engage the thread and draw the same between said strands.

15. A tuft making machine comprising a winding device for winding a binding thread around a bunch of strands, a horn arranged to be engaged by a part of said thread, parts of said thread extending tangentially in opposite directions from the strands to said winding device and horn and crossing each other, a movable deflector having two shouldered prongs, which engage with said crossed parts of the thread and deflect the same out of their normal position, and a needle adapted to engage the outer end of one of said crossed parts of the thread and draw the same between said strands.

16. A tuft making machine comprising a winding device for winding a binding thread around a bunch of strands, a horn arranged to be engaged by a part of said thread, a reciprocating deflector adapted to deflect the thread between said horn and the strands, means for operating said deflector comprising a slide carrying the deflector and a rock shaft provided with an arm engaging with said slide, and a needle adapted to engage said thread and draw the same between said strands.

17. A tuft making machine comprising a rotatable winder adapted to wind a binding thread around a bunch of strands, means for securing the binding thread and a tension device operating on said thread in advance of said winder for keeping the thread taut and comprising an upper stationary spring and a lower vertically movable spring between which the thread is adapted to be gripped, and means for raising and lowering said lower spring, comprising a rock shaft having an arm and a rod connecting said arm with said lower spring.

18. A tuft making machine comprising a rotatable winder adapted to wind a binding thread around a bunch of strands and a tension device operating on said thread in advance of said winder for keeping the thread taut and comprising an upper stationary spring and a lower vertically movable spring between which the thread is adapted to be gripped, and means for raising and lowering said lower spring, a stationary horn which is mounted on said tubular guide and which is adapted to be engaged by a part of said thread, and a needle for drawing said thread between said strands.

19. A tuft making machine comprising a winding device adapted to wind a binding thread around a bunch of strands, means for securing the binding thread, a cutter mechanism for severing said strands at intervals between the winding places thereof comprising a stationary blade and a movable blade coöperating with the stationary blade, a rock shaft having an arm, a rod connecting said arm with said movable blade, a leaf spring engaging with said rod and mounted on a support, and an adjusting screw mounted on said support and engaging with said leaf spring.

Witness my hand this 2nd day of December, 1911.

HUBERT C. HOLLENBECK.

Witnesses:
E. M. GRAHAM,
ANNA HEIGIS.

Copies of this patent may be obtained for five cents each, by addressing the "Commissioner of Patents, Washington, D. C."